US009384156B2

(12) United States Patent
Quach et al.

(10) Patent No.: US 9,384,156 B2
(45) Date of Patent: Jul. 5, 2016

(54) SUPPORT FOR IOAPIC INTERRUPTS IN AMBA-BASED DEVICES (71) Applicant: MICROSOFT TECHNOLOGY LICENSING, LLC, Redmond, WA (US)

(72) Inventors: Nhon Quach, San Jose, CA (US); Stephen Z. Au, Union City, CA (US); Thomas Zou, Millbrae, CA (US); Tracy Sharpe, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 278 days.

(21) Appl. No.: 14/086,860

(22) Filed: Nov. 21, 2013

(65) Prior Publication Data

US 2015/0143014 A1 May 21, 2015

(51) Int. Cl.
*G06F 13/24* (2006.01)
*G06F 13/28* (2006.01)
*G06F 13/32* (2006.01)
*G06F 13/38* (2006.01)
*G06F 13/40* (2006.01)

(52) U.S. Cl.
CPC ............... *G06F 13/32* (2013.01); *G06F 13/24* (2013.01); *G06F 13/28* (2013.01); *G06F 13/385* (2013.01); *G06F 2213/0026* (2013.01); *G06F 2213/0038* (2013.01)

(58) Field of Classification Search
CPC ......... G06F 13/24; G06F 13/28; G06F 13/32; G06F 13/385; G06F 13/4027; G06F 2213/0026; G06F 2213/0038
See application file for complete search history.

(56) References Cited

U.S. PATENT DOCUMENTS

| 6,496,517 | B1 | 12/2002 | Gehman et al. |
| 6,816,750 | B1 | 11/2004 | Klaas |
| 2007/0067527 | A1 | 3/2007 | Saitoh |
| 2009/0070511 | A1* | 3/2009 | Kaushik ................ G06F 9/3885 710/267 |
| 2010/0131692 | A1* | 5/2010 | Nishizawa .............. G06F 13/32 710/310 |
| 2011/0106981 | A1* | 5/2011 | Watkins ............... G06F 13/4221 710/9 |
| 2012/0162234 | A1 | 6/2012 | Blinzer et al. |
| 2013/0079148 | A1 | 3/2013 | Bond |

OTHER PUBLICATIONS

ISA European Patent Office, International Search Report and Written Opinion issued in PCT/US2014/066022, Mar. 11, 2015, Netherlands, 9 Pages.

(Continued)

*Primary Examiner* — Eric Oberly
(74) *Attorney, Agent, or Firm* — Gregg Wisdom; Judy Yee; Micky Minhas (57) ABSTRACT One disclosed computing system comprises a x86 processor, memory, a PCIe root complex (RC), a PCIe bus, and an interconnect chip having a PCIe endpoint (EP) that is connected to the PCIe RC through a PCIe link, the PCIe EP being connected to an AMBA® bus. The interconnect chip may communicate with the IO device via the AMBA® bus in an AMBA® compliant manner and communicate with the host system in a PCIe compliant manner. This communication may include receiving a command from the processor, sending the command to the IO device over the AMBA® bus, receiving a response from the IO device over the AMBA® bus, and sending over the AMBA® bus and the PCIe link one or more DMA operations to the memory. Further communication may include sending an IOAPIC interrupt to the processor of the host system according to PCIe ordering rules.

20 Claims, 7 Drawing Sheets (56) References Cited

OTHER PUBLICATIONS

"The ARM Cortex-A9 Processors", ARM, http://www.arm.com/files/pdf/armcortexa-9processors.pdf, Sep. 2009, 11 pages.

Otani, Sugako et al., "Peach: A Multicore Communication System on Chip with PCI Express", IEEE Micro, vol. 31, Issue 6, Nov. 2011, 12 pages.

"Programmable Priority Interrupt Controller for ARM 7/9 (APIC)", Cadence Design Systems Inc., http://w2.cadence.com/products/ip/Cadence/APIC_DataSheet.pdf, Feb. 2007, 8 pages.

"Synopsys IP for PCI Express 2.0 (Gen II) Passes PCI-SIG Compliance", Design & Reuse, http://www.design-reuse.com/news/15254/synopsys-ip-pci-express-2-0-gen-ii-passes-pci-sig-compliance.html, Feb. 14, 2007, 3 pages.

* cited by examiner

SUPPORT FOR IOAPIC INTERRUPTS IN AMBA-BASED DEVICES

BACKGROUND

Peripheral hardware devices are often connected to a system-on-a-chip (SoC) through a PCIe (Peripheral Component Interconnect Express) interconnect. Together, the SoC and the peripheral hardware devices form a computer. This is the case for computers running operating systems (OS) configured to run on x86 processors. PCIe links allow the connected peripheral hardware devices to communicate with the host, specifically to read and write data. Traditionally, x86 based systems have been designed to enforce PCIe ordering rules in an end-to-end fashion from the device to the x86 processor and vice versa. The enforcement of PCIe ordering rules allows correct operation of producer/consumer communication models popular in a modern OS.

The producer-consumer communication model allows both the processor and IO (Input/Output) devices to assume the role of producer or consumer. In the example of a user wishing to display a photograph saved on a hard disk to the monitor, the producer, in this case the hard disk, first writes the data making up the photograph to the host system memory under the control of a software driver. In a PCIe compliant system, the hard disk then must notify the processor using IOAPIC interrupts that the data is available. The consumer, in this case the processor, will then read the data in the photograph from memory and display it on the monitor.

In recent years, particularly in smartphones and other portable computing devices, controllers for IO devices based on ARM® AMBA® (Advanced Microcontroller Bus Architecture) architecture have proliferated. Many of these AMBA® based controllers, however, only understand the AMBA® bus protocol. As such, they are not compatible with PCIe based host systems because they do not support the type of ordering rules required for correctly handling IOAPIC (Input/Output Advanced Programmable Interrupt Controller) style interrupts. Due to this incompatibility, AMBA® based peripheral IO devices cannot directly interact with PCIe based host systems.

SUMMARY

Computer systems and methods for supporting IOAPIC interrupts between an AMBA® compliant IO device and a PCIe compliant computing system are disclosed herein. One disclosed computing system comprises an x86 compatible host system including at least one x86 compatible processor with memory, a PCIe root complex (RC), and a PCIe bus to which the processor, memory, and PCIe RC are communicatively connected. The computing system may further comprise an interconnect chip having a PCIe EP that is connected to the PCIe RC of the host system through a PCIe link, the PCIe EP being connected to an AMBA® bus. The interconnect chip may communicate with the IO device via the AMBA® bus in an AMBA® compliant manner and communicate with the host system in a PCIe compliant manner. This communication may include receiving a command from the processor for the IO device, sending the command to the IO device over the AMBA® bus, receiving a response from the IO device over the AMBA® bus, and upon receiving the response, sending over the AMBA® bus and over the PCIe link one or more DMA operations to the memory. After sending the DMA operations to the memory, further communication may include sending an IOAPIC interrupt to the processor of the host system according to PCIe rules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
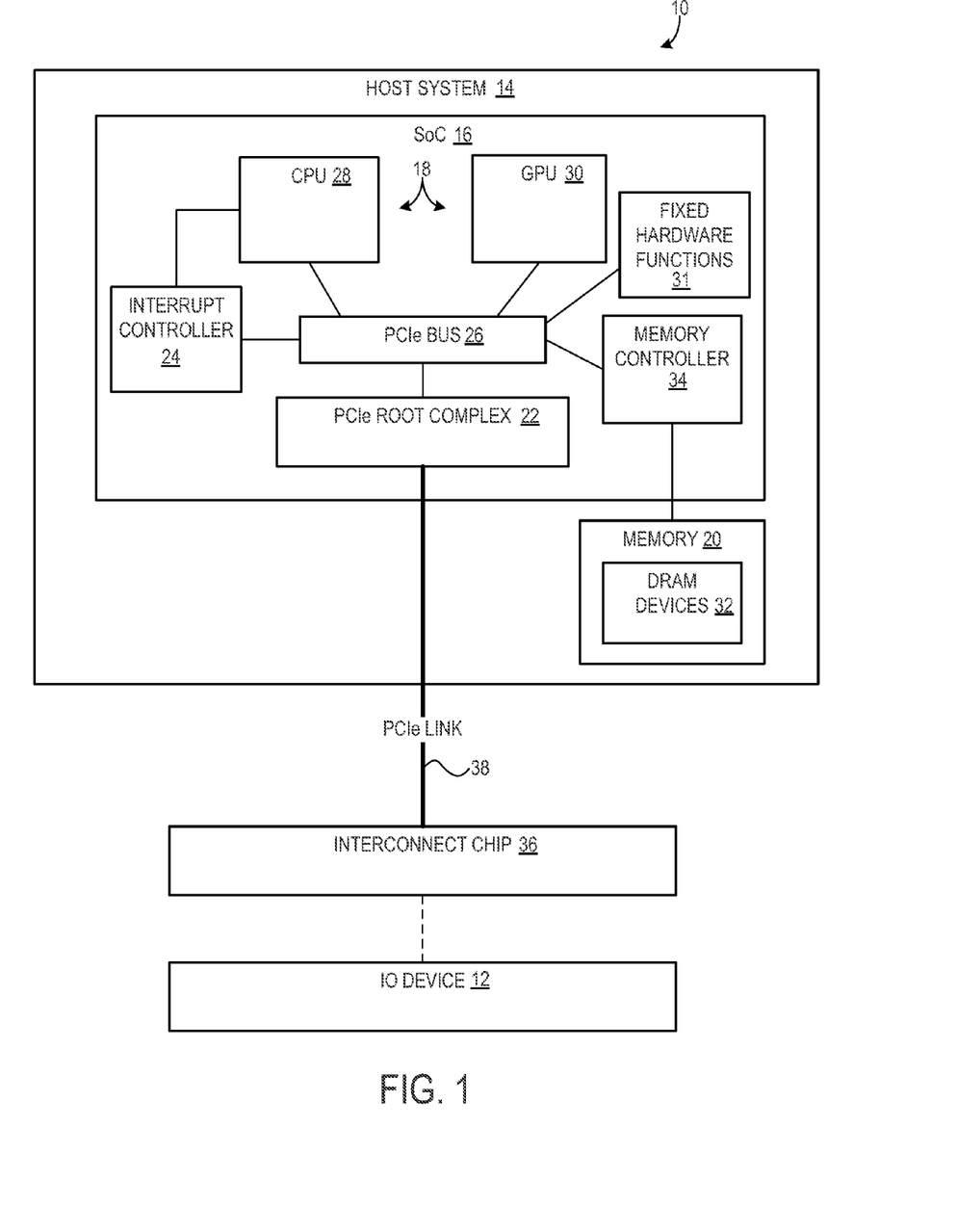
FIG. 1 is a schematic view of a computing system removably connected to an AMBA® compliant IO device according to an embodiment of the present disclosure.

Turning now to FIG. 1, a computing system 10 for supporting IOAPIC interrupts between an IO device 12 and the computing system 10 is depicted. The IO device 12 may be an AMBA® compliant IO device and the computing system 10 may be a PCIe compliant computing system. The computing system 10 may comprise an x86 compatible host system 14 including an x86 compatible processor 18, memory 20, a PCIe RC 22, an interrupt controller 24, and a PCIe bus 26 to which the processor 18, memory 20, PCIe RC 22, and interrupt controller 24 are communicatively connected.

The processors 18 may include a central processing unit (CPU) 28, a graphics processing unit (GPU) 30, and other fixed hardware functions 31 such as a video decoder/encoder. CPU 28 may be a multi-core processor such as a dual-, quad-, or octa-core processor, or it may be a single core processor. The computing system 10 may be running any suitable OS that supports PCIe architecture and IOAPIC style interrupts, including WINDOWS®, LINUX®, and others. The IO device 12 may be any suitable IO device that interfaces with AMBA® architecture, including USB (universal serial bus) devices using USB 3.0, SATA (Serial Advanced Technology Attachment) based storage devices, multimedia cards using eMMC (embedded Multi-Media Controller), etc.

In one embodiment, the host system 14 is formed as a system-on-a-chip (SoC) 16 and the memory 20 is embodied as DRAM devices 32 existing outside of the SoC in the same or different packages and connected to a memory controller 34 within the SoC. The processor 18, memory 20, PCIe RC 22, interrupt controller 24, and PCIe bus 26 of the host system 14 may also exist as separate components mounted on a printed circuit board, for example.

The host system 14 may be connected to an interconnect chip 36 via a PCIe link 38, and the interconnect chip 36 may be connected to the IO device 12. In this way, the host system 14 may communicate with the IO device 12 through the interconnect chip 36, as described in detail below.

Figure 2:
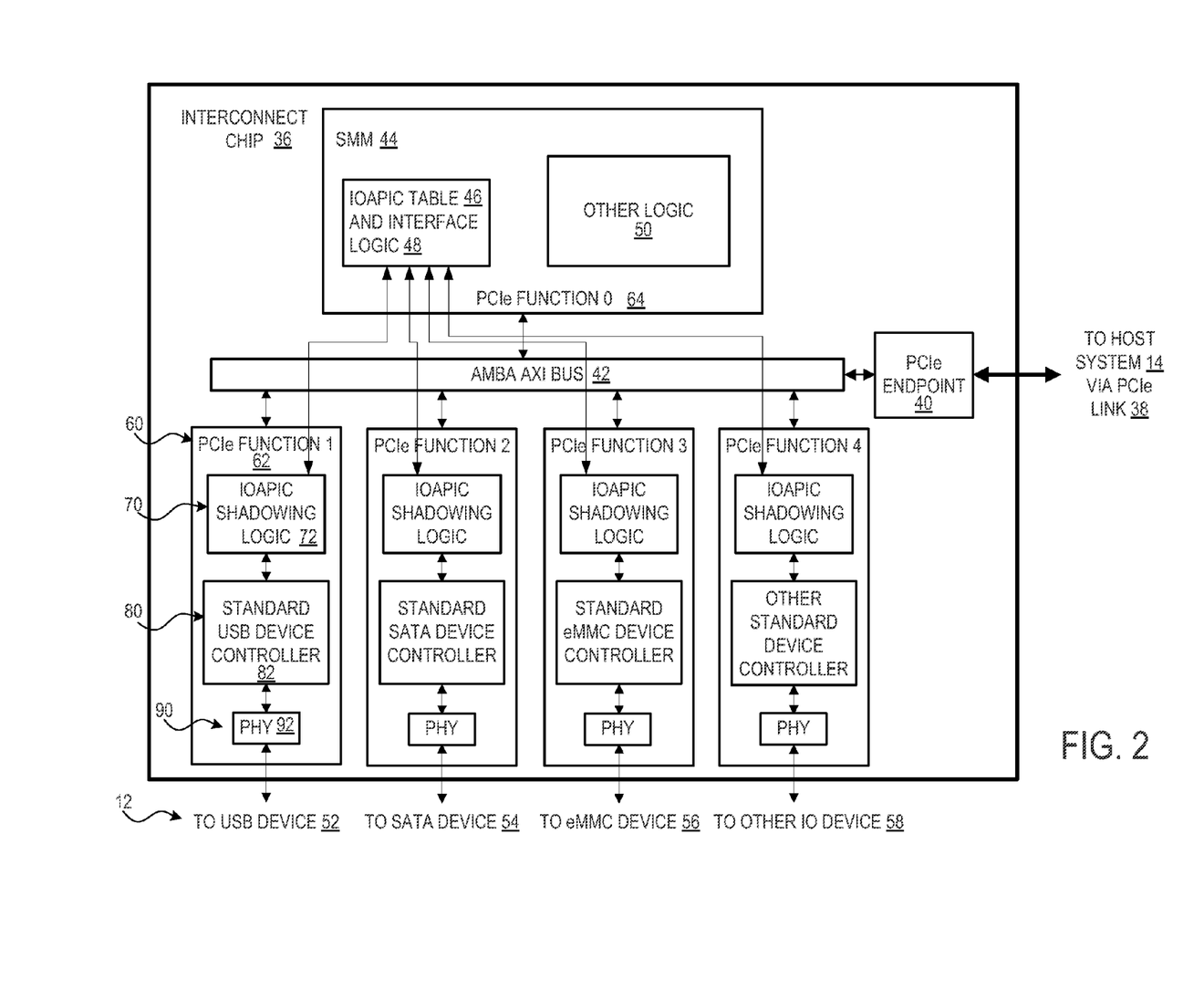
FIG. 2 is a schematic view showing internal details of an interconnect chip of the computing system of FIG. 1.

Communication in a PCIe compliant system follows the producer-consumer model, as mentioned earlier. In the model, the producer generates data and the consumer removes it from a queue in the memory. The processor 18 of the host system 14 and the IO device 12 can each be the producer while the other is the consumer. In the case where the IO device 12 is the producer, the model fails if the IO device 12 notifies the processor 18 too early via an ending interrupt that the generated data is ready and the data is not yet in the queue in the memory. In the case where the IO device 12 is the consumer, the model fails if the IO device 12 notifies the processor 18 via the ending interrupt too early that the IO device 12 is done using the generated data and the data has not yet been seen by the IO device 12. One function that interrupts provide is to comply with the producer-consumer model by allowing the processor 18 to execute other tasks while the IO device 12 is executing Direct Memory Access (DMA) operations per commands from the processor 18, then notifying the processor 18 through an interrupt that the IO device 12 is finished. FIG. 2 is a schematic view showing internal details of the interconnect chip 36 of FIG. 1. The interconnect chip 36 may have a PCIe EP 40 that is connected to the PCIe RC 22 of the host system through the PCIe link 38. The PCIe EP 40 may be connected to an AMBA® bus 42. It will be appreciated that the interconnect chip 36 may be formed physically separated from the SoC 16 of the host system 14 or it may be integrated into the SoC 16.

The interconnect chip 36 may communicate with the IO device 12 via the AMBA® bus 42 in an AMBA® compliant manner, and communicate with the host system 14 in a PCIe compliant manner. As one particular example, the AMBA® bus 42 may be an AMBA® AXI bus. This communication may occur by the interconnect chip 36 receiving a command from the processor 18 for the IO device 12 and sending the command to the IO device 12 over the AMBA® bus 42. The interconnect chip 36 may then receive a response from the IO device 12 over the AMBA® bus 42, and upon receiving the response, send over the AMBA® bus 42 and over the PCIe link 38 one or more DMA operations to the memory 20 of the host system 14. After sending the DMA operations to the memory 20, the interconnect chip 36 may send an IOAPIC interrupt to the processor 18 of the host system 14 according to PCIe ordering rules, which are described below.

The one or more DMA operations may include one or a plurality of related DMA reads, all carrying the transaction ID assigned to the IO device. In this case, the sending of the IOAPIC interrupt carrying the same transaction ID as the IO device occurs after the DMA reads have reached the memory and the requested data from the memory 20 is received by the IO device 12. The one or more DMA operations may alternatively include one or a plurality of related DMA writes carrying the same ID as the IO device. In this case, the IOAPIC interrupt pushes all earlier DMA writes with the same transaction ID to complete. That is, the IOAPIC interrupt cannot be completed until all the earlier writes with the same transaction ID have successfully made it to the memory. In this way, when the host system receives the interrupt, it can be sure that all data is already in the memory, ready for consumption. Pushing follows PCIe read/write ordering rules. For example, writes do not push reads according to PCIe ordering rules. However, writes do push other earlier writes in the sequence they are received.

It will be appreciated that in typical operation, both DMA writes and DMA reads are processed by the computing system. Therefore, in a typical process flow, interconnect chip may receive a first command from the processor for the IO device, send the first command to the IO device over the AMBA® bus, receive a first response from the IO device over the AMBA® bus, and upon receiving the first response, send over the AMBA® bus and over the PCIe link a plurality of related DMA reads to the memory of the host system. Further, after sending the DMA reads to the memory and after the DMA reads have reached the memory and the requested data from the memory is received by the IO device, the interconnect chip may send a first IOAPIC interrupt to the processor of the host system according to PCIe ordering rules. In addition, the interconnect chip may receive a second command from the processor for the IO device, send the second command to the IO device over the AMBA® bus, receive a second response from the IO device over the AMBA® bus, upon receiving the second response, send over the AMBA® bus and over the PCIe link a plurality of related DMA writes to the memory of the host system. Further, after sending the DMA writes to the memory, the interconnect chip may send a second IOAPIC interrupt to the processor of the host system according to PCIe ordering rules, wherein the second IOAPIC interrupt pushes all related DMA writes, i.e., DMA writes with the same transaction ID, to complete. Additionally, after receiving the interrupt, the processor may query status registers in the IO device to decide what action to take, since the IO device may have experienced an error rather than completing the one or more DMA operations.

The interconnect chip 36 may include a system management module (SMM) 44 with an IOAPIC table 46 and interface logic 48, plus other logic 50. The interface logic 48 is executed to glue the IOAPIC table 46. The other logic is executed to interact with the host system 14. The SMM 44 may be connected directly to the AMBA® bus 42 as a PCIe function or embedded in another PCIe function.

The interconnect chip 36 may connect to one or a plurality of IO devices 12. In the depicted embodiment of FIG. 2, IO device 12 may be a USB device 52, SATA device 54, eMMC device 56, or other IO device 58. Each IO device 12 may have a corresponding PCIe function 60, while the SMM 44 may be "PCIe function 0" 64, for example. Within each PCIe function 60, the interconnect chip 36 may include for each IO device 12 that is connected, a respective device controller 80, shadowing logic 70, and physical layer (PHY) 90. For instance, if the IO device 12 is a USB device 52, then the USB device 52 may connect to a first PCIe function 62 through PHY 92 and utilizing USB device controller 82 and shadowing logic 72. The shadowing logic 70 may contain information from a table entry of the IOAPIC table 46 in the interconnect chip 36. The information from the entry may include, specific to the IO device 12, an interrupt vector, a host destination ID, and a trigger mode. Tables 1-4 below provide detailed information on the contents of the IOAPIC table.

TABLE 1

| IOAPIC Interrupt Write Address Format | | | | | | |
|---|---|---|---|---|---|---|
| 63:32 | 31:20 | 19:12 | 11:4 | 3 | 2 | 1:0 |
| 0 | FEE'h | DID | EDID | RH | DestM | 00 |

TABLE 2

IOAPIC Interrupt Write Address Format Description

| Field Name | Bits | Default | Description |
|---|---|---|---|
| | 1:0 | NA | Always 0 |
| DestM | 2 | NA | Destination Mode. Obtained from the DestM field in the redirection entry. |
| RH | 3 | NA | Redirection Hint. When 0, the message will be delivered to the CPU agent listed in bits [19:4]. When 1, the message may be redirected. This bit is set to 1 if DM is 001'b (i.e., lowest priority); otherwise, it's 0. |
| EDID | 11:4 | NA | Extended ID. Obtained from the redirection entry. |
| DID | 19:12 | NA | Destination ID. Obtained from the redirection entry. |
| | 31:20 | NA | Always equal to FEEh |
| | 63:32 | NA | Equal to 0. |

TABLE 3

IOAPIC Interrupt Write Data Format

| 31:17 | 16 | 15 | 14 | 13:12 | 11 | 10:8 | 7:0 |
|---|---|---|---|---|---|---|---|
| 0000'h | HIT | TM | DS | 00 | DestM | DM | Vec |

TABLE 4

IOAPIC Interrupt Write Data Format Description

| Field Name | Bits | Default | Description |
|---|---|---|---|
| Vec | 7:0 | NA | Interrupt Vector. Obtained from the redirection table |
| DM | 10:8 | NA | Delivery Mode. Obtained from the redirection table. |
| DestM | 11 | NA | Destination Mode. Obtained from the redirection table. |
| Reserved | 13:12 | 0h | |
| DS | 14 | 1b | |
| TM | 15 | NA | Trigger Mode. Obtained from the redirection table. |
| HIT | 16 | 0 | HPET Interrupt Tag. This field is only applicable for HPET interrupts only. When HPET interrupt tagging is enabled, this bit is 1; otherwise this bit is 0. |
| Reserved | 31:16 | 0 | |

The IOAPIC table 46 may be programmed upon boot up of the computing system 10. The interconnect chip 36 may be configured to detect the IO device 12 connected to the interconnect chip 36 and announce the presence of the IO device 12 to the processor 18. The interconnect chip 36 may then receive programming of an entry inside the IOAPIC table 46 within the SMM 44 by the processor 18. The entry may include, specific to the IO device 12, an interrupt vector (i.e. a memory address at which an interrupt handler is located), a host destination ID, and a trigger mode.

Figure 3:
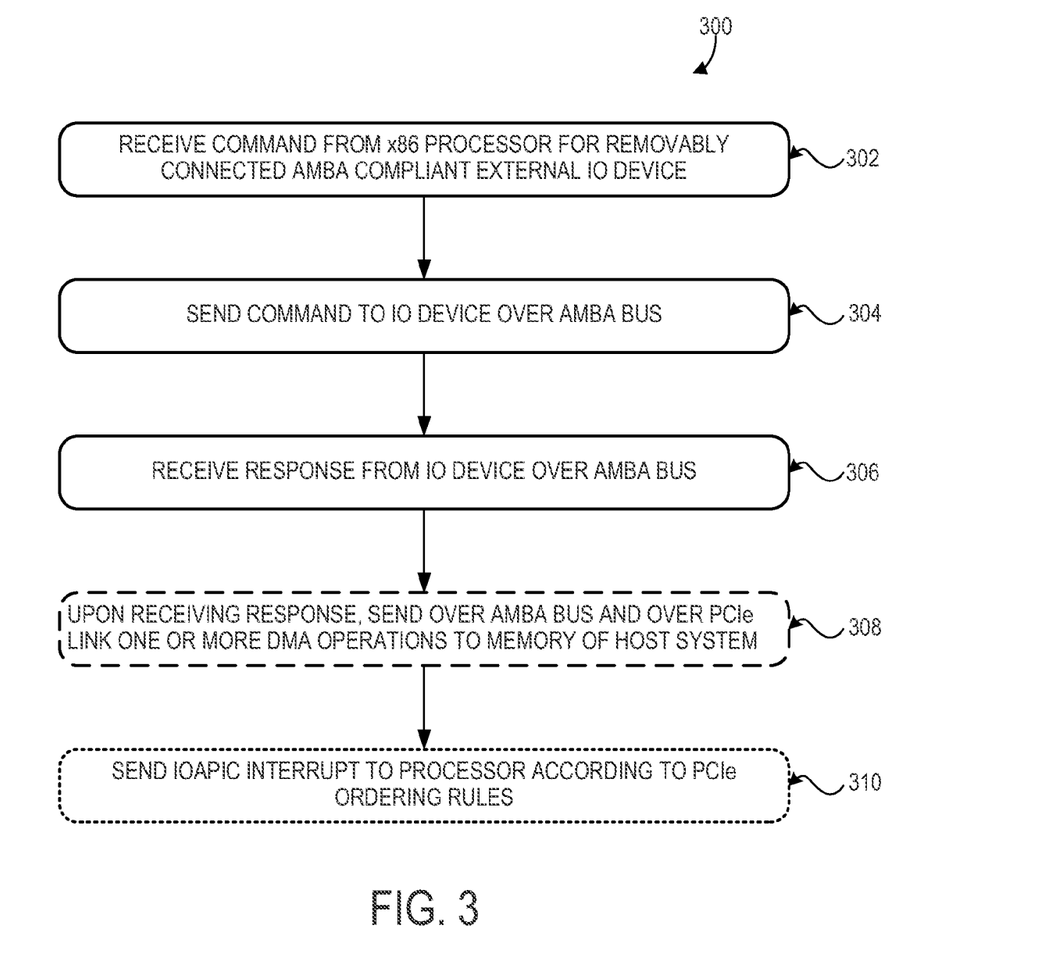
FIG. 3 is a flowchart of a method for supporting IOAPIC interrupts between the IO device and the computing system according to an embodiment of the present disclosure.

On the AMBA® bus 42, all operations from the same IO device 12 carry the same transaction ID and all operations with the same transaction ID exit the AMBA® bus 42 and reach the PCIe EP 40 in order. There is no enforcement of ordering with regards to operations from different IO devices 12 because they carry different transaction IDs. Thus, without the shadowing logic 70, there would be no way for the IO device 12 to issue an IOAPIC interrupt having the same transaction ID as the DMA operations. With shadowing logic 70, the IOAPIC interrupt is able to be generated, formatted, and sent immediately following the sending of the DMA writes or the return of the DMA read data since the interrupt has the same transaction ID as the DMA operations, which designates it as coming next in line on the AMBA® bus 42 after the DMA operations. Once the interrupt reaches the PCIe EP 40, PCIe ordering rules will automatically be followed because the PCIe EP 40, the PCIe link 38, and the PCIe RC 22 of the host system 14 will enforce them, as required by the PCIe specification. Turning now to FIG. 3, a flowchart of a method 300 for supporting IOAPIC interrupts between an IO device and a computing system is depicted. The methods described hereafter may be implemented on hardware described above with reference to FIGS. 1 and 2, or by other suitable devices. Accordingly, the IO device may be an AMBA® compliant IO device, and the computing system may be a PCIe compliant computing system, as described above. For example, the IO device may be a USB device, a SATA device, or an eMMC device, among others. The computing system may be a game console and the IO device may be a smartphone or a device located within a smartphone, as but two particular examples. In one embodiment, a processor, memory, PCIe RC, and PCIe bus of a host system of the computing system may be formed as an SoC. In another, an interconnect chip may be formed separately from the SoC of the host system.

Figure 4A:
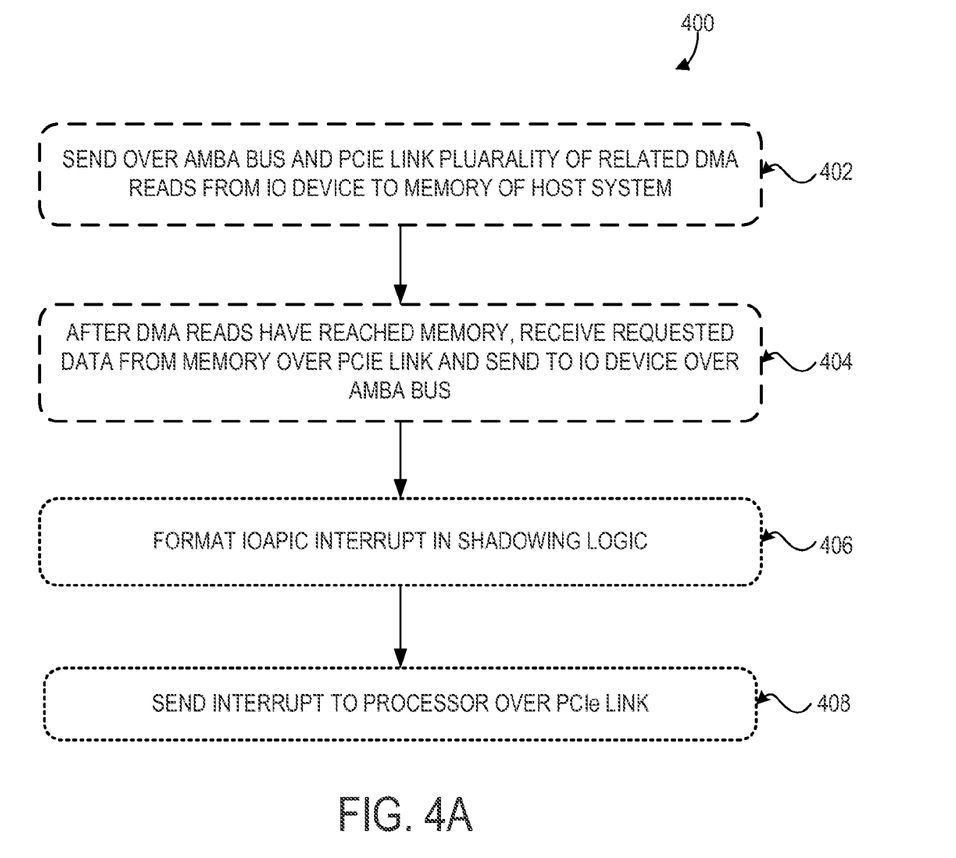
FIGS. 4A and 4B are flowcharts that illustrate example substeps by which steps of the method of FIG. 3 may be accomplished, respectively, according to an embodiment of the present disclosure.
Figure 4B:
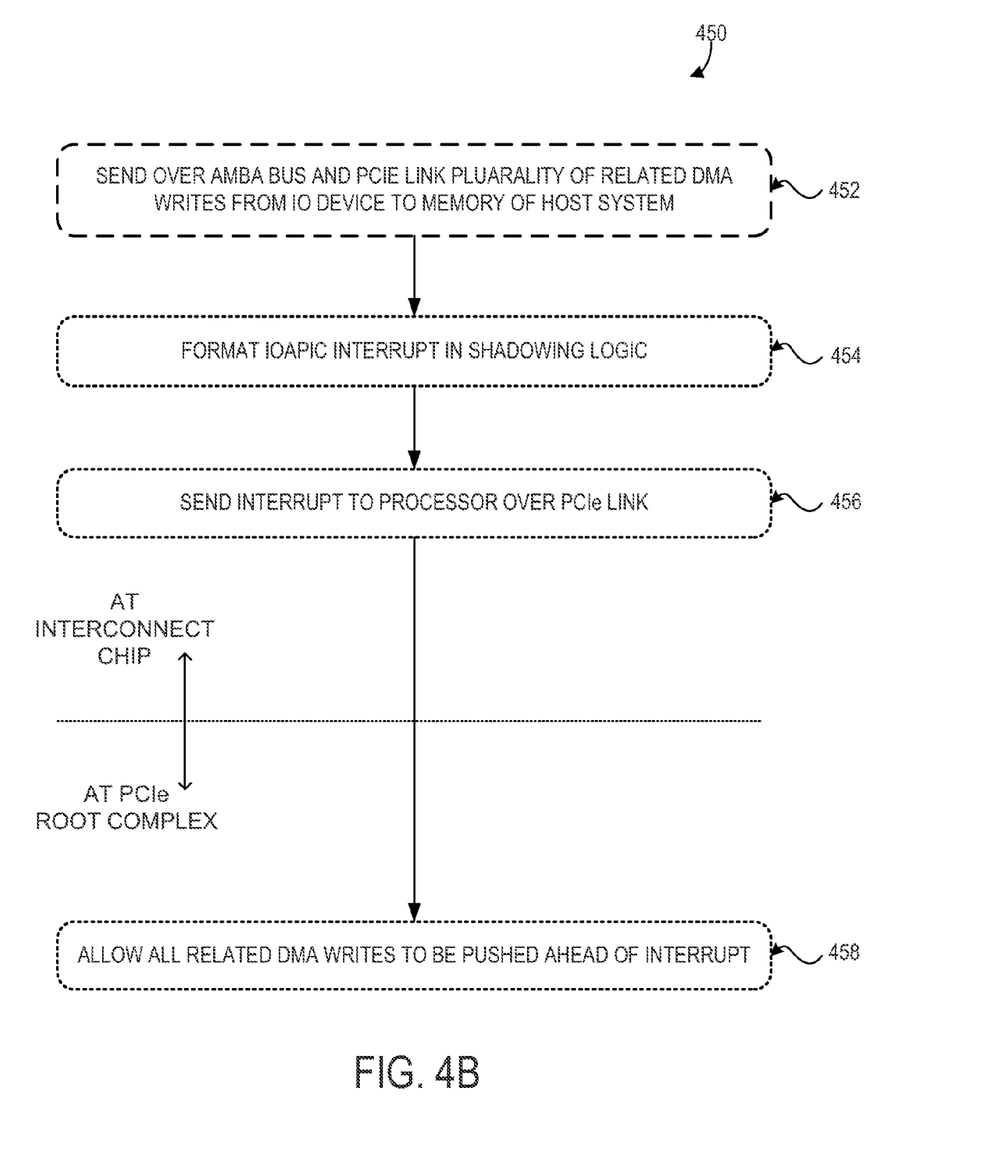

The method 300 may include at 302 receiving a command for the IO device from the processor in the host system of the computing system. At 304, the method 300 may include sending the command to the IO device over an AMBA® bus on the interconnect chip. At 306, the method 300 may optionally include receiving a response from the IO device over the AMBA® bus. At 308, the method 300 may include, upon receiving the response, sending over the AMBA® bus and over a PCIe link one or more DMA operations to the memory of the computing system. At 310 the method 300 may include, after sending the one or more DMA operations to the memory, sending an IOAPIC interrupt to the processor of the host system according to PCIe ordering rules. Method steps 308 and 310 have been divided into substeps for the cases of when the one or more DMA operations may include DMA reads or DMA writes. FIGS. 4A and 4B depict each case respectively and are described below. It will be appreciated that method 300 may include either the process flow shown in FIG. 4A or 4B, or may include both the process flows shown in FIGS. 4A and 4B, performed consecutively in series.

FIG. 4A shows a flowchart for a method 400 that illustrates example substeps by which method steps 308 and 310 of method 300 may be accomplished. The DMA operations may include a plurality of related DMA reads. At 402, the method 400 may include sending the DMA reads from the IO device, over the AMBA® bus and the PCIe link, to the memory. At 404 the method 400 may include the DMA reads reaching the memory and requested data from the memory being received by the IO device. At 406 the method 400 may include formatting the IOAPIC interrupt in the shadowing logic. The method by which the shadowing logic is programmed to be able to format the IOAPIC interrupt is described below with reference to FIG. 5. At 408 the method 400 may include sending the IOAPIC interrupt to the processor, the sending of the IOAPIC interrupt occurring after all of the related DMA reads have reached the memory and the requested data from the memory has been received by the IO device because writes, in this example the IOAPIC interrupt, do not push reads, in this case the related DMA reads, according to PCIe ordering rules.

FIG. 4B shows a flowchart for a method 450 that also illustrates example substeps by which method steps 308 and 310 of method 300 may be accomplished. In this case, the DMA operations may include a plurality of related DMA writes. At 452 the method 450 may include sending the DMA writes from the IO device, over the AMBA® bus and the PCIe link, to the memory. At 454 the method 450 may include formatting the IOAPIC interrupt in the shadowing logic. At 456 the method 450 may include sending the IOAPIC interrupt to the processor. According to PCIe ordering rules, the IOAPIC interrupt may push all related DMA writes to complete because the IOAPIC interrupt is a write and writes may push other writes, as depicted at 458.

Figure 5:
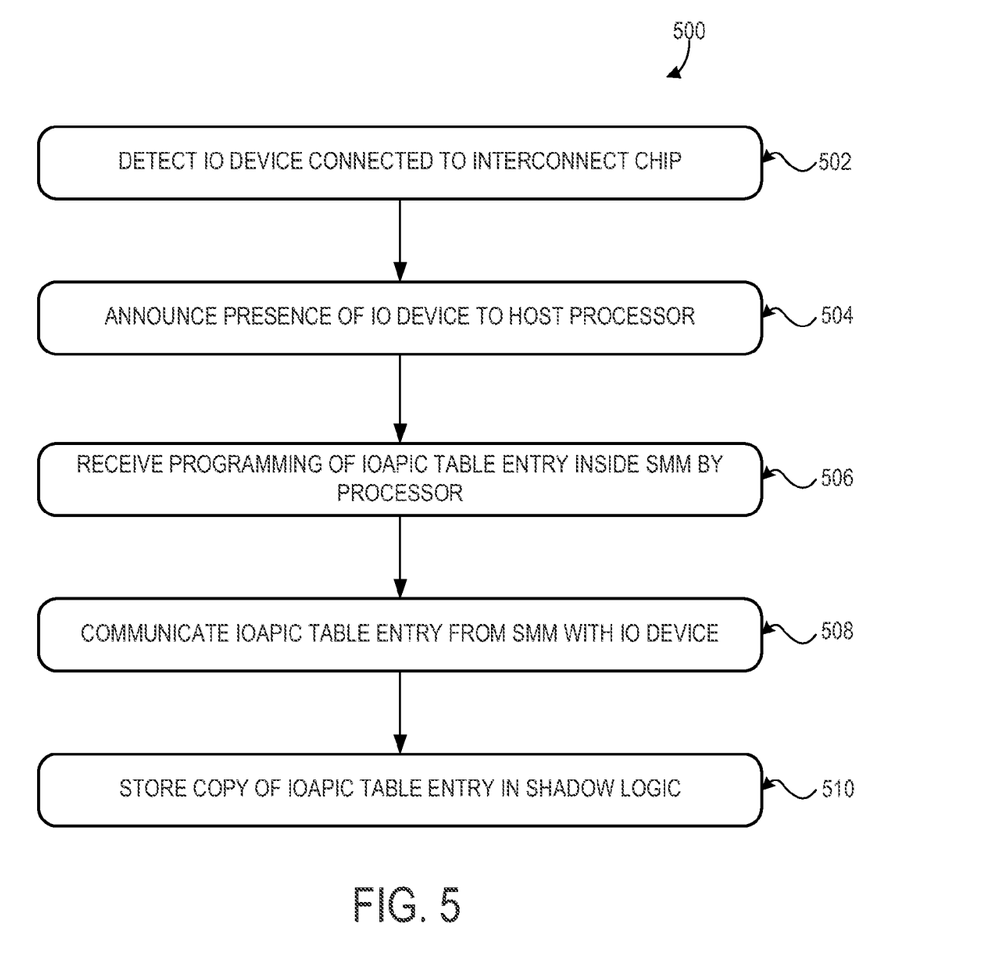
FIG. 5 is a flowchart of a method for establishing communication between an AMBA® compliant IO device and a PCIe compliant host system according to an embodiment of the present disclosure.

Turning now to FIG. 5, a flowchart for a setup method 500 for initially establishing communication between the computing system and the IO device is depicted. At 502 method 500 may include the interconnect chip detecting the IO device connected to the interconnect chip. This may occur upon boot up of the computing system or when the IO device is initially connected to the computing system. At 504 method 500 may include announcing the presence of the IO device to the processor. The interconnect chip may include an SMM with an IOAPIC table, and the SMM may be connected to the AMBA® bus. At 506 method 500 may include receiving programming of an entry inside the IOAPIC table within the SMM by the processor. As described above, the entry includes, specific to the IO device, an interrupt vector, a host destination ID, and a trigger mode. At 508 method 500 may include communicating the IOAPIC table entry of the SMM with the IO device.

The interconnect chip may include shadowing logic and a device controller, and the shadowing logic may contain the information from the table entry of the IOAPIC table in the SMM of the interconnect chip. As with the IOAPIC table in the SMM, the information from the entry may include, specific to the IO device, an interrupt vector, a host destination ID, and a trigger mode. At 510 method 500 may include storing a copy of the IOAPIC table in the shadowing logic.

It will be appreciated that the above described systems and methods may be implemented to support IOAPIC interrupts in communications between a AMBA® compliant IO device and a PCIe compliant computing system, by utilizing an interconnect chip that can communicate with the IO device 12 via an AMBA® bus in an AMBA® compliant manner and communicate with the host system in a PCIe compliant manner. Upon receiving a DMA operation request from a PCIe-side processor at an AMBA-side IO device, according to the systems and methods described herein, the IO device performs the DMA operations and sends an interrupt request to the shadowing logic with the same transaction ID as the just performed DMA operations. In this manner the shadowing logic formats and sends an OAPIC interrupt to the PCIe-side processor, as the processor would expect to receive in a PCIe compliant system.

Without the presently disclosed embodiments, interrupts from the AMBA compliant IO device would not carry the same transaction ID as the previous DMA operations. As a result, the interrupt could reach the processor before the DMA operations reach the memory, since the interrupt would not have the ability to push the DMA operations ahead of it in the queue. This would result in a breakdown in the producer-consumer communication model. Accordingly, the presently disclosed embodiments provide the benefit of overcoming the technical challenge associated with the lack of compatibility between these two systems heretofore.

Figure 6:
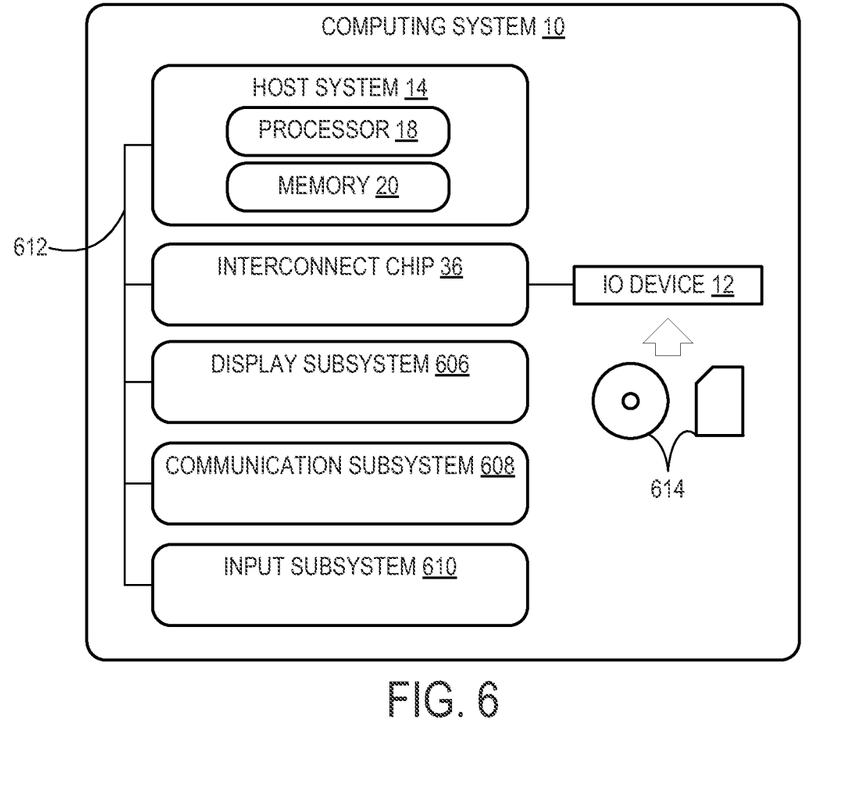
FIG. 6 is a schematic view showing additional details of the components of the computing system 10.

FIG. 6 illustrates the computing environment in which the above described systems and methods may be implemented. As illustrated in FIG. 6, computing system 10 may include not only host system 14 with a processor 18 and memory 20, an interconnect chip 36 and an IO device 12, as described above, but also may include a display subsystem 606, communication system 608, and input subsystem 610, all linked by a communications bus subsystem 612, which may include PCIe link 38 described above.

Computing system 10 may take the form of one or more personal computers, server computers, tablet computers, home-entertainment computers, network computing devices, gaming devices, mobile computing devices, mobile communication devices (e.g., smart phone), and/or other computing devices.

As discussed above, IO devices 12 include USB devices using USB 3.0, SATA based storage devices, and multimedia cards using eMMC. Thus, the IO devices 12 may include one or more mass storage devices, which may include removable and/or built-in devices, such as optical storage devices (e.g., CD, DVD, HD-DVD, Blu-Ray Disc, etc.) and/or magnetic memory (e.g., hard-disk drive, floppy-disk drive, tape drive, MRAM, etc.), among others.

The IO devices 12 may be configured to include built in or removable computer readable storage media 614. Computer readable storage media 614 are hardware devices configured as non-volatile memory on which instructions are stored that when executed by processor 18 of the host system using portions of the memory 20, cause the processor 18 to implement certain methods and processes. It will be appreciated that since the instructions are stored in a non-volatile manner, even when power is cut to the I/O device 12 and computer readable storage media 614, the instructions remain stored, and can be retrieved upon the next power-up of the IO device 12. Exemplary computer readable storage media include FLASH memory, EPROM, EEPROM, CD-ROM, DVD-ROM, etc.

The processor 18 of the host system 14 is a physical device configured to execute instructions using portions of memory 20. For example, the processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Memory 20 includes one or more physical devices configured to hold instructions executable by the processor 18. Memory 20 may include volatile memory such as RAM or DRAM which hold the instructions for a finite duration during processing but typically do not continue to store the instructions after the computing system is powered down, or non-volatile memory such as FLASH, EPROM, EEPROM, etc., which hold the instructions for a finite duration during processing, and which also continue to hold the instructions even when power is cut to the computing system. In contrast to storage in memory 20, aspects of the instructions described herein may be propagated by a communication medium (e.g., a physical device that is carrier for an electromagnetic signal, optical signal, etc.), which does not hold the instructions for a finite duration.

Aspects of processor 18 and memory 20 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SoC), and complex programmable logic devices (CPLDs), for example.

A display subsystem 606 may be used to present a visual representation of data held by memory 20. This visual representation may take the form of a graphical user interface (GUI). As the herein described methods and processes change the data held by memory 20 or the computer readable storage media 614, and thus transform the state of the memory 20 or the computer readable storage media 614, the state of display subsystem 606 may likewise be transformed to visually represent changes in the underlying data. Display subsystem 606 may include one or more display devices utilizing virtually any type of technology. Such display devices may be combined with processor 18 and/or memory 20 in a shared enclosure, or such display devices may be peripheral display devices.

Input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

Communication subsystem 608 may be configured to communicatively couple computing system 10 with one or more other computing devices. Communication subsystem 608 may include wired and/or wireless communication devices compatible with one or more different communication protocols. As non-limiting examples, the communication subsystem 608 may be configured for communication via a wireless telephone network, or a wired or wireless local- or wide-area network. In some embodiments, the communication subsystem may allow computing system 608 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system for supporting IOAPIC interrupts between an IO device and the computing system, wherein the IO device is compliant with an AMBA specification, and wherein the computing system is a PCIe compliant computing system, the computing system comprising:
   an x86 compatible host system including:
     an x86 compatible processor;
     memory;
     a PCIe root complex (RC); and
     a PCIe bus to which the processor, memory, and PCIe RC are communicatively connected; and
   an interconnect chip having a PCIe endpoint (EP) that is connected to the PCIe RC of the host system through a PCIe link, the PCIe EP of the interconnect chip being connected to another bus compliant with the AMBA specification, wherein the interconnect chip communicates with the IO device via the other bus in a manner compliant with the AMBA specification, and communicates with the host system in a PCIe compliant manner, by:
     receiving a command from the processor for the IO device;
     sending the command to the IO device over the other bus;
     receiving a response from the IO device over the other bus;
     upon receiving the response, sending over the other bus and over the PCIe link one or more DMA operations to the memory of the host system; and
     after sending the DMA operations to the memory, sending an IOAPIC interrupt to the processor of the host system according to PCIe ordering rules.

2. The system of claim 1, wherein the one or more DMA operations include a plurality of related DMA reads, and the sending of the IOAPIC interrupt occurs after the DMA reads have reached the memory and the requested data from the memory is received by the IO device.

3. The system of claim 1, wherein the one or more DMA operations include a plurality of related DMA writes, and the IOAPIC interrupt pushes all related DMA writes to complete.

4. The system of claim 1, wherein the processor, memory, PCIe RC, and PCIe bus of the host system are formed as a system-on-a-chip (SoC).

5. The system of claim 4, wherein the interconnect chip is formed physically separated from the SoC of the host system.

6. The system of claim 1, wherein the interconnect chip includes a system management module (SMM) with an IOAPIC table, the SMM being connected to the other bus.

7. The system of claim 6, wherein upon boot up of the computing system, the interconnect chip is configured to:
   detect the IO device connected to the interconnect chip;
   announce the presence of the IO device to the processor; and
   receive programming of an entry inside the IOAPIC table within the SMM by the processor, the entry including, specific to the IO device, an interrupt vector, a host destination ID, and a trigger mode.

8. The system of claim 6, wherein the interconnect chip includes shadowing logic and a device controller, the shadowing logic containing information from a table entry of the IOAPIC table in the interconnect chip, wherein the information from the entry includes, specific to the IO device, an interrupt vector, a host destination ID, and a trigger mode.

9. The system of claim 1, wherein the IO device is a USB device, a SATA device, or an eMMC device.

10. A method for supporting IOAPIC interrupts between an IO device and a computing system, wherein the IO device is compliant with an AMBA specification, and wherein the computing system is a PCIe compliant computing system, the method comprising:
   receiving a command for the IO device from a processor in a host system of the computing system;
   sending the command to the IO device over a bus compliant with the AMBA specification on an interconnect chip;
   receiving a response from the IO device over the bus;
   upon receiving the response, sending over the bus and over a PCIe link one or more DMA operations to memory of the computing system; and after sending the one or more DMA operations to the memory, sending an IOAPIC interrupt to the processor of the host system according to PCIe ordering rules.

11. The method of claim 10, wherein the DMA operations include a plurality of related DMA reads, and the sending of the IOAPIC interrupt occurs after the DMA reads have reached the memory and requested data from the memory is received by the IO device.

12. The method of claim 10, wherein the DMA operations include a plurality of related DMA writes, and the IOAPIC interrupt pushes all related DMA writes to complete.

13. The method of claim 10, wherein the processor, the memory, a PCIe RC, and a PCIe bus of the host system are formed as a system-on-a-chip (SoC).

14. The method of claim 13, wherein the interconnect chip is formed separately from the SoC of the host system.

15. The method of claim 10, wherein the interconnect chip includes a system management module (SMM) with an IOAPIC table, the SMM being connected to the bus.

16. The method of claim 15, wherein upon boot up of the computing system, the interconnect chip is configured to:
   detect the IO device connected to the interconnect chip;
   announce the presence of the IO device to the processor; and
   receive programming of an entry inside the IOAPIC table within the SMM by the processor, the entry including, specific to the IO device, an interrupt vector, a host destination ID, and a trigger mode.

17. The method of claim 15, wherein the interconnect chip includes shadowing logic and a device controller, the shadowing logic containing information from a table entry of the IOAPIC table in the interconnect chip, wherein the information from the entry includes, specific to the IO device, an interrupt vector, a host destination ID, and a trigger mode.

18. The method of claim 10, wherein the IO device is a USB device, a SATA device, or an eMMC device.

19. The method of claim 10, wherein the computing system is a game console and the IO device is a smartphone.

20. A computing system for supporting IOAPIC interrupts between an IO device and the computing system, wherein the IO device is compliant with an AMBA specification, and wherein the computing system is a PCIe compliant computing system, the computing system comprising:
   an x86 compatible host system including:
      an x86 compatible processor;
      memory;
      a PCIe root complex (RC); and
      a PCIe bus to which the processor, memory, and PCIe RC are communicatively connected; and
   an interconnect chip having a PCIe endpoint (EP) that is connected to the PCIe RC of the host system through a PCIe link, the PCIe EP of the interconnect chip being connected to another bus compliant with the AMBA specification, wherein the interconnect chip communicates with the IO device via the other bus in a manner compliant with the AMBA specification, and communicates with the host system in a PCIe compliant manner, by:
      receiving a first command from the processor for the IO device;
      sending the first command to the IO device over the other bus;
      receiving a first response from the IO device over the other bus;
      upon receiving the first response, sending over the other bus and over the PCIe link a plurality of related DMA reads to the memory of the host system;
      after sending the DMA reads to the memory and after the DMA reads have reached the memory and the requested data from the memory is received by the IO device, sending a first IOAPIC interrupt to the processor of the host system according to PCIe ordering rules;
      receiving a second command from the processor for the IO device;
      sending the second command to the IO device over the other bus;
      receiving a second response from the IO device over the other bus;
      upon receiving the second response, sending over the other bus and over the PCIe link a plurality of related DMA writes to the memory of the host system; and
      after sending the DMA writes to the memory, sending a second IOAPIC interrupt to the processor of the host system according to PCIe ordering rules, wherein the second IOAPIC interrupt pushes all related DMA writes to complete.

* * * * *